(12) United States Patent
Dennis et al.

(10) Patent No.: US 6,860,553 B2
(45) Date of Patent: Mar. 1, 2005

(54) IMPACT-G-FORCE VECTOR-MODIFYING SEAT STRUCTURE AND METHOD

(75) Inventors: Michael R. Dennis, Scappoose, OR (US); Gerhard Paasche, Scappose, OR (US)

(73) Assignee: MJD Innovations, LLC, Scappoose, OR (US)

(*) Notice: Subject to any disclaimer, the term of this patent is extended or adjusted under 35 U.S.C. 154(b) by 0 days.

(21) Appl. No.: 10/426,136

(22) Filed: Apr. 29, 2003

(65) Prior Publication Data

US 2004/0245815 A1 Dec. 9, 2004

(51) Int. Cl.[7] .................................................. B60N 2/42
(52) U.S. Cl. ........................... 297/216.13; 297/216.1; 297/216.14; 297/216.7; 244/122 R; 280/751
(58) Field of Search ..................... 297/216.1, 216.12, 297/216.13, 216.14, 216.15, 216.16, 216.17, 216.18, 216.19, 485, 344.1, 344.14; 244/122 R, 122 B, 122 AG, 121

(56) References Cited

U.S. PATENT DOCUMENTS

| 4,175,723 A | * 11/1979 | Shea, Jr. ..................... 244/162 |
| 4,178,032 A | * 12/1979 | Hone ........................... 296/19 |
| 4,784,352 A | * 11/1988 | Smith et al. ............ 244/122 AG |
| 4,787,576 A | * 11/1988 | McGrady et al. ........ 244/122 R |
| 5,979,827 A | * 11/1999 | Corcoran ................ 244/122 R |

* cited by examiner

Primary Examiner—Peter M. Cuomo
Assistant Examiner—Erika Garrett
(74) Attorney, Agent, or Firm—Jon M. Dickinson, PC; Robert D. Varitz, PC

(57) ABSTRACT

An impact-G-force, vector-modifying seat structure in a vehicle, which seat structure introduces, in a forward crash situation, and in a generally vertical plane, a special forward, then upward, and then rearward rotation of the base of the spine of a seated occupant. This motion tends to minimize crash injuries.

4 Claims, 1 Drawing Sheet

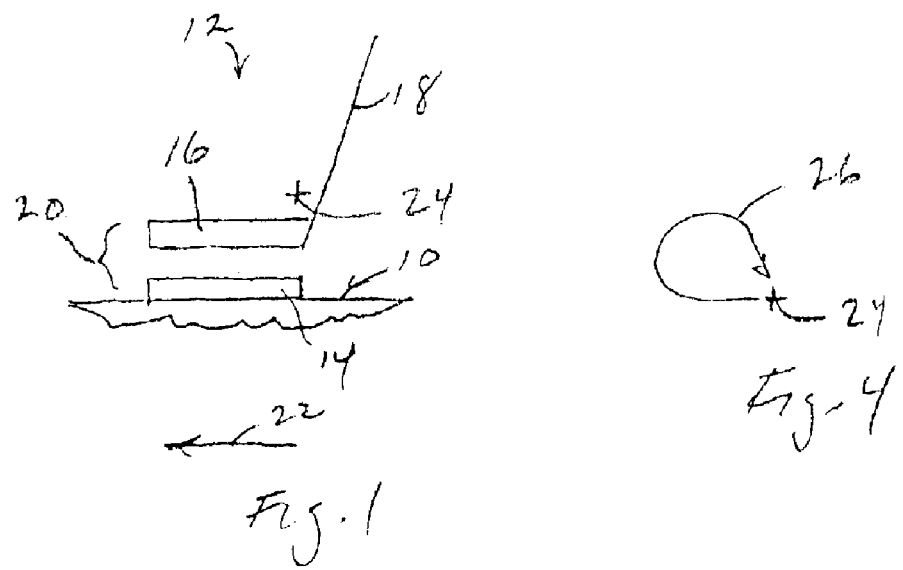
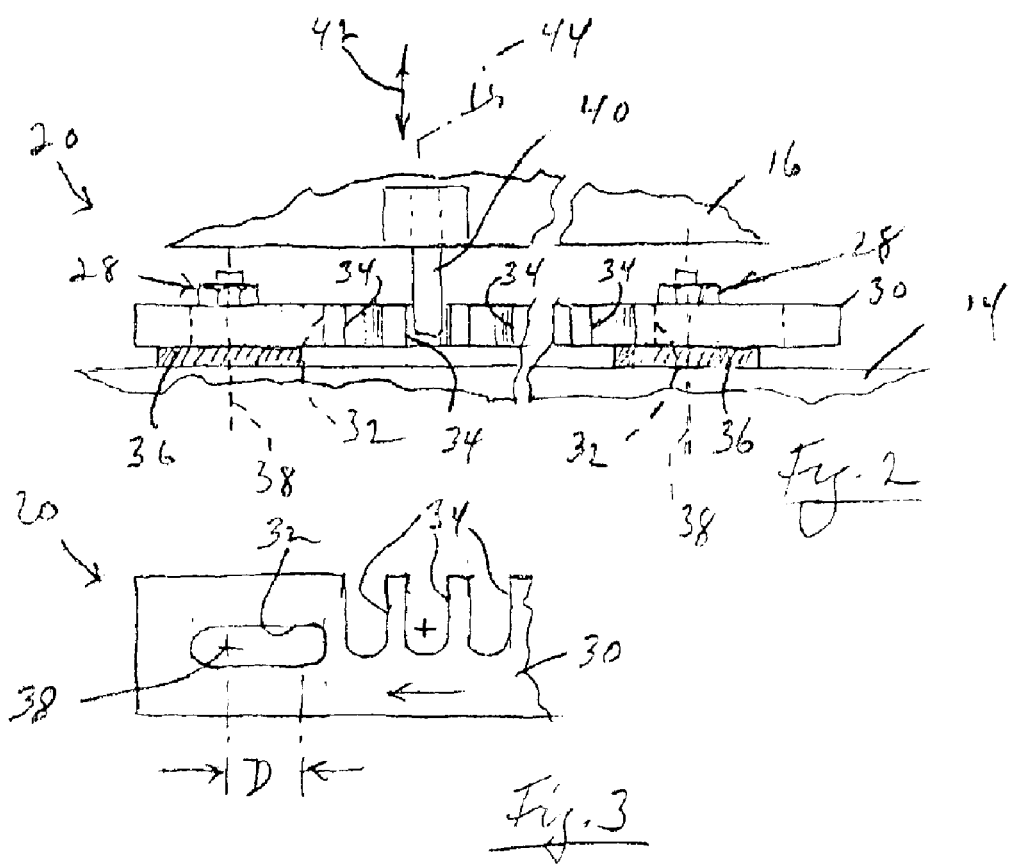

IMPACT-G-FORCE VECTOR-MODIFYING SEAT STRUCTURE AND METHOD

BACKGROUND AND SUMMARY OF THE INVENTION

This invention relates to seat structure employable in a high-speed vehicle such as an aircraft, and more specifically, to a seat structure and an associated method which, upon the occurrence of an impact, such as a crash, vector-modify the impact G-force transmitted to a seat occupant in a manner which introduces a special companion/component force that has a vector direction which lies at an angle relative to that of such an introduced G-force.

Quite by surprise, we have discovered that, with respect to the base of the spine of a seat occupant in an aircraft during a crash, if one introduces a special kind of vector modification of G-forces that are delivered to the base of the spine, it is possible very significantly to minimize injury, and even the likelihood of fatality. The specific modification which we have discovered that accomplishes this involves a vector force modification that introduces to the base of the spine, during an impact crash, for example, vector forces that produce a kind of rotary motion of the base of the spine as viewed from the side of the spine. This special kind of rotation includes a slight forward motion, followed immediately by an upward and rearward rotational motion.

To implement this finding in a useful way, we have created a special seat structure that includes interactive components (also called defeatable, frictional-clamping break-away structure herein) which, effectively, break somewhat free of one another during a crash impact to promote the introduction of the injury-reducing vector-change rotary motion just briefly mentioned above.

A preferred and best mode embodiment of the invention are described herein below in relation to the accompanying drawings, a reading of all of which will serve to explain to those skilled in the art just how to practice this invention, and how to appreciate its contribution to significant injury minimization.

DESCRIPTION OF THE DRAWINGS

FIG. 1 is a very simplified and schematic side elevation of an aircraft passenger seat effectively anchored to the frame in the aircraft, and including mechanism which implements both the structure and the method of the present invention.

FIG. 2 is an enlarged, fragmentary, and still somewhat simplified close-up detail illustrating more specifically the special mechanism of this invention which is included in the seat structure pictured in FIG. 1.

FIG. 3 is a fragmentary view taken generally along the line 3—3 in FIG. 2.

FIG. 4 is a side-view, vector-force diagram which describes the vector-modifying force behavior of the present invention that induces the kind of forward, then upward, and then rearward rotary motion for the base of the spine described generally hereinabove.

DETAILED DESCRIPTION OF THE INVENTION

Turning now to the drawings, and referring first of all to FIG. 1, indicated generally at 10 is a fragment of an aircraft frame to which a passenger occupant vector-modifying seat structure 12 constructed in accordance with the invention is attached. Seat structure 12 includes a base 14 which is directly and fixedly anchored to frame 10, a seat panel structure 16 which directly underlies a seated occupant, a seatback 18, and mechanism (also referred to herein as defeatable, frictional-clamping break-away structure) constructed in accordance with the present invention, represented generally by a bracket 20, which effectively acts between seat structure 12 and frame 10 and more specifically between seat base 14 and seat panel structure 16, on the occurrence of a crash impact. Mechanism 20 herein acts normally in a manner which, before an impact event, participates in defeatably anchoring seat panel structure 16 with respect to seat base 14. The seat panel structure 16, and the panel-support structure 18, are determinedly non-springy structures herein. They create very little spring rebound to an impact event, and are referred to herein as lacking any appreciable spring constant.

Seat structure 12 is constructed in any one of a number of well-known manners to allow an occupant to adjust the fore and aft position of panel structure 16 relative to base 14, in a lockable and releasable fashion. The details of this structure are not specifically shown herein, inasmuch as they do not form any part of the present invention.

As will become more fully apparent, if the aircraft possessing frame 10 and carrying seat structure 12 crashes while traveling generally in the direction of arrow 22 in FIG. 1, the base of the spine of an occupant of seat structure 12, which spine base is represented generally by the cross that is labeled 24 in FIG. 1, is subjected to a modified vector G-force which causes the base of the spine to travel in a specialized kind of rotary upwardly and then rearwardly directed manner, as is illustrated generally by the compoundly curved arrow 26 in FIG. 4. FIGS. 1 and 4 are taken, generally speaking, from the same lateral point of view with respect to seat structure 12. This modified vector force condition is characterized by plural, substantially simultaneously acting companion forces, and these forces, insofar as they are relevant to the behavior and operation of the present invention, act substantially in a common vertical plane.

Turning attention now to FIGS. 2 and 3 to describe one preferred manner of implementing mechanism 20, mounted by a pair of spaced nut-and-bolt clamping assemblies 28 on seat base 14 is an elongate, generally horizontal, flat member, or slide component, 30 which includes, near its opposite ends, two elongate slots 32, and between these two slots a plurality of outwardly facing, generally U-shaped through-passages (vertically speaking), such as those shown at 34, passages 34 are also referred to herein as slots. Very specifically, component 30 is appropriately tightened, in its manner of fastening to seat base 14, through a pair of low-friction frictioning plates 36 which generally underlie slots 32, and which receive the shanks of the bolts in nut-and-bolt assemblies 28. These same bolt shanks pass through slots 32, with the tightening nuts, which are secured to the bolt shanks, bearing downwardly on the upper surface of member 30. Preferably, the generally described components so far pictured and labeled in FIGS. 2 and 3 are positioned in such a fashion that the mentioned bolt shanks extend through slots 32 near the left, or forward, ends of these slots as pictured in FIGS. 2 and 3. The axes of the mentioned bolt shanks are shown by dashed lines 38 in FIG. 2, and by a small cross (for just one of these axes) which is also given reference numeral 38 in FIG. 3. The combination herein of assemblies 28, component 3, slots 32 and plate 36 is referred to as fore and aft, defeatable, frictional clamping break-away structure. Appropriately mounted on seat panel structure 16, and very specifically on that side of this panel structure which is visible in FIGS. 1 and 2, is a vertically shiftable, spring-biased plunger, or slide-drive member, 40 which can be lifted and lowered, as indicated by double-headed arrow 42 in FIG. 2, through a lift/lower drive connection represented by fragmentary dash-dot-line 44 in FIG. 2. This drive connection is established with the mechanism previously mentioned which operates to release seat panel structure 16 relative to base 14 at the selection of a seat occupant to position the fore and aft location of the seat panel structure relative to base 14. In FIG. 2 in the drawings, the plunger 40 is shown downwardly extending into one of previously mentioned slots 34, and may be relied upon to establish, or assist in establishing, a locked, fore and aft selected position of seat panel structure 16 relative to base 14. The interrelationship which exists between plunger 40 and a slot 34 is referred to herein as a slide-drive connection.

On the occurrence of a forward impact, such as an airplane crash, the plunger in mechanism 40, acting as a slide-drive member, drives forwardly against the front side of the associated slot 34 with respect to which it is disposed, and very specifically drives (breaks away) member 30 slidably forwardly over low-frictioning plates 36 and against the tightened resistance of nut-and-bolt assemblies 28. Member 30 thus, effectively, "breaks away" from this fixed (initially) position relative to seat base 14, and undergoes a certain amount of immediate, limited forward sliding travel by the distance D indicated generally in FIG. 3. It is this simple, limited-forward-motion break-away sliding action which, in relation to a forward impact crash of an aircraft such as that which has just been suggested, introduces modified G-force vectors to the base of a seat occupant's spine to create a condition wherein the base of the spine undergoes the specialized forward, upward, and then rearward rotary motion pictured at 26 in FIG. 4. Non-intuitive though it may seem, observations performed in test simulations have clearly demonstrated that the event of a forward crash causes the base of the spine, when it is associated with a seat possessing the mechanism of the present invention, definitively to undergo the vector-changed rotary motion described herein. And, as was mentioned earlier, simulation tests that have been performed utilizing this invention produce confirmed "injury numbers" that are significantly lower than those same kind of injury numbers which one observes in the absence of mechanism 20 of the invention.

Accordingly, while a preferred and best mode manner of implementing and practicing the present invention have been illustrated and described herein, it is recognized that variations and modifications may be made in the specific structural arrangements capable of creating the unique vector force conditions proposed. All such variations and modifications are deemed to come within the scope of this invention.

We claim:

1. Impact-G-force, vector-modifying seat structure in a vehicle having a frame, said seat structure, in operative condition, comprising a seat base anchored to the vehicle frame, seat panel structure for directly receiving and generally vertically supporting the seated anatomy of an occupant under circumstances with the panel structure underlying the base of that occupant's spine, and fore and aft, defeatable, frictional-clamping break-away structure operatively interposed said panel structure and said base, and defeatably anchoring the panel structure to the base, operable, on the transmission of an impact G-force through the seat base and the seat panel structure to the occupant, to introduce a related, companion/component force having a vector direction which lies at an angle relative to that of such a G-force.

2. The seat structure of claim 1, wherein the vectors of such companion forces exist generally in a common vertical plane.

3. The seat structure of claim 1, wherein one vector associated with such companion/component forces is generally forwardly directed in the direction of forward travel of the vehicle.

4. The seat structure of claim 1, wherein said break-away structure includes a slide component interposed said panel structure and said seat base through a friction plate, and which further comprises a slide-drive connection between said panel structure and said slide component.

* * * * *

UNITED STATES PATENT AND TRADEMARK OFFICE
CERTIFICATE OF CORRECTION

PATENT NO. : 6,860,553 B2
DATED : March 1, 2005
INVENTOR(S) : Michael R. Dennis et al.

It is certified that error appears in the above-identified patent and that said Letters Patent is hereby corrected as shown below:

Column 2,
Line 48, change ", passages 34" to -- . Passages 34 --.
Line 64, change "3" to -- 30 --.

Signed and Sealed this

Seventh Day of June, 2005

JON W. DUDAS
*Director of the United States Patent and Trademark Office*